Aug. 9, 1932.                S. A. HASBROUCK                1,871,055
          LIQUID SUPPLYING MEANS FOR AIRCRAFT ENGINES
                       Filed June 19, 1930
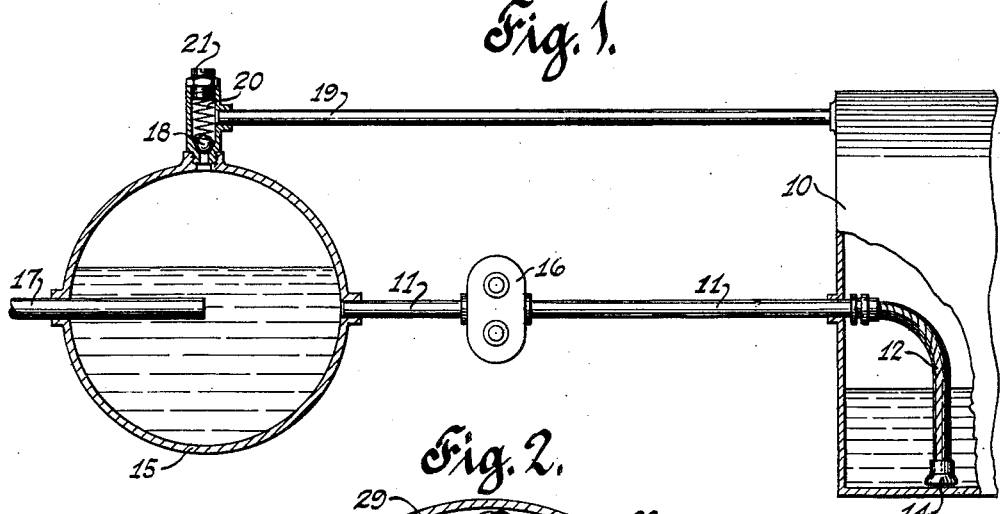
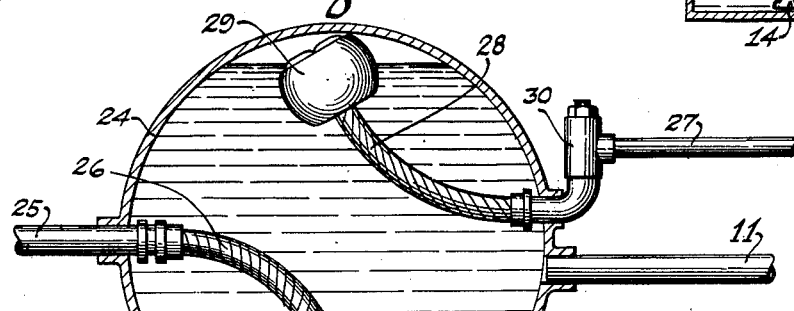
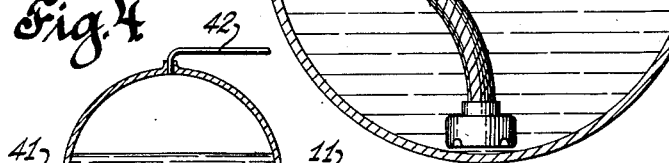
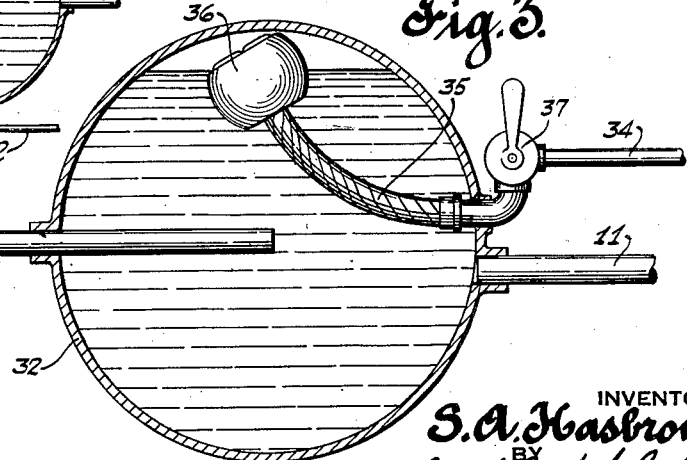
INVENTOR
S. A. Hasbrouck
BY
Joseph K. Schofield
ATTORNEY Patented Aug. 9, 1932

1,871,055

UNITED STATES PATENT OFFICE

STEPHEN A. HASBROUCK, OF NEW HAVEN, CONNECTICUT, ASSIGNOR TO PRATT & WHITNEY AIRCRAFT COMPANY, OF EAST HARTFORD, CONNECTICUT, A CORPORATION OF DELAWARE

LIQUID SUPPLYING MEANS FOR AIRCRAFT ENGINES

Application filed June 19, 1930. Serial No. 462,307.

This invention relates to fuel or lubricant supplying means for aircraft engines and particularly to a supplying means for liquids to an engine from a main tank which will be operable equally well in any position of the aircraft.

A primary object of the invention is to provide an improved liquid supplying system in which a quantity of liquid fuel, lubricant, or other material is maintained in a secondary tank from which it may be withdrawn as needed by the engine with the plane in any position.

A further object of the invention is to provide continuous admitting means for liquids to a secondary or intermediate tank, means being provided to limit the pressure within the intermediate tank and to provide means to withdraw air therefrom.

And finally it is an object to provide an intermediate or supplementary tank for liquids such as fuel or lubricants with a supply line extending from an intermediate and preferably central point within the secondary tank to the engine so that with the plane and tank in any oblique or inverted position the supply line will be maintained submerged as long as there is a supply of liquid within the secondary tank sufficient to maintain the tank more than half full.

With the above and other objects in view, my invention includes the features of construction and operation set forth in the following specification and illustrated in the accompanying drawing.

In the accompanying drawing annexed hereto and forming a part of this specification, I have shown my invention embodied in a fuel supplying means for an internal combustion aircraft engine, but it will be understood that the invention can be otherwise embodied and that the drawing is not to be construed as defining or limiting the scope of the invention, the claims appended to this specification being relied upon for that purpose.

In the drawing:

Fig. 1 is a side view partly in section of the complete mechanism forming one embodiment of the present fuel supplying means.

Fig. 2 is a view in section of a slightly modified form of the intermediate or secondary tank shown in Fig. 1.

Fig. 3 is a view similar to Fig. 2 of a different modification, and

Fig. 4 shows a still further modified form for the construction of the intermediate tank.

In the above mentioned drawing I have shown several embodiments of the invention particularly adapted for admitting liquid fuel to an internal combustion engine which are now deemed preferable, but it is to be understood that changes and modifications may be made within the scope of the appended claims without departing from the spirit of the invention.

In modern aircraft practice it has now become essential to provide means enabling a plane to be operated equally well in any oblique or inverted position, at least for short periods of time. The present invention relating to fluid admitting means to an aircraft engine is so designed that the aircraft and its engine may be turned to any oblique or inverted position without adversely affecting the admission of the liquid to the engine.

Briefly and in its preferred aspect, therefore, my invention includes the following principal parts: First, a main supply tank for the liquid to be admitted to the engine; second, a secondary or intermediate tank; third, a conduit connecting the two tanks and preferably provided with a pump for continuously supplying the secondary tank with liquid from the main or first tank; fourth, a conduit leading from an intermediate point of the secondary tank to the internal combustion or other form of engine; and fifth, a return connection or system from the secondary tank to the main tank adapted to limit the accumulation of pressure within the secondary tank, eliminate air therefrom, and prevent waste of the fuel or other liquid.

Referring more in detail to the figures of the drawing, I provide a main tank 10 with a delivery conduit 11 preferably entering the main tank at an intermediate point in its height. A flexible tubing 12 is preferably connected to this delivery pipe within the tank 10 and provided with a weight 14 at its free end so that it will be maintained submerged below the level of fuel in any position of the main tank 10. At the opposite end of this delivery pipe 11 is a secondary tank 15, preferably and as shown of cylindrical or spherical form. Within the delivery pipe 11 at an intermediate point is a pump 16 indicated as of the gear type for continuously forcing the liquid from the main tank 10 to the secondary tank 15.

Extending from substantially a central portion of the secondary tank 15 is a delivery pipe 17 leading to the fuel admitting or other means for the engine or other equipment to be supplied with liquid. As shown, this conduit 17 extends from substantially the central portion of the secondary tank 15 so that in any position of the tank 15 the opening of this pipe 17 will be below the surface of the liquid so long as the tank 15 is more than half filled.

Connected to the secondary tank 15 and preferably at a position which is substantially at the top while the aeroplane and tank are in their normal positions, is a relief valve 18 shown as of the ball type spring pressed normally toward its seat. This relief valve 18 is connected by means of a return pipe or conduit 19 to the main tank 10. By means of this relief valve 18 and return pipe 19 air is allowed to escape from the secondary tank back to the main tank from which it may be vented and any excess liquid supplied to this tank may be returned to the main supply tank. The secondary tank 15 is therefore at all times maintained with liquid supplied from the main tank 10 and allowed to overflow and discharge an excess of liquid and any entrapped air back to the main tank. To limit or regulate the pressure within the tank 15 the compression of the spring 20 acting upon the valve 18 may be adjusted by means of a screw 21 bearing against its opposite end.

In Fig. 2 a modified form of intermediate or secondary tank is indicated. The pipe 25 extending to the engine carburetor or other part to be supplied with liquid is provided with a flexible tubing 26 extending within the secondary tank 24, its free end being weighted so that it is always maintained below the surface of the liquid. Also the return pipe 27 from the secondary tank 24 to its main tank may, at its inner end, be connected to a flexible tubing 28 having a float 29 at its free end so that the open end of this tubing 28 is maintained always upon or above the surface of the liquid and any air within the tank 26 may be returned through the return pipe 27 having, if desired, a relief valve 30 therein similar to that shown in Fig. 1.

In Fig. 3 another embodiment of the invention is shown, in this case the secondary tank 32 has its discharge conduit 33 leading to the engine extending inwardly, similarly to that shown in Fig. 1, that is, substantially to a central portion of this tank. The return pipe 34 is provided at its inner end with a flexible tube 35 and float 36, similarly to those shown in Fig. 2, but is shown provided with a simple form of stop cock 37 so that any air within the intermediate tank 32 may be periodically removed as occasion arises by manual operation of this valve 37.

In Fig. 4 is shown a simple embodiment of the invention having a secondary tank 40 provided with the form of discharge pipe 41 similar to that shown in Fig. 1. Two overflow or return pipes 42 of small diameter are employed extending from diametrically opposite points of the tank 40. With the tank 40 tilted to any position, one of the return pipes 42 will be in an upper portion of the tank so that entrapped air may be returned to the main tank. The size of the return pipes 42 is so chosen that they will return any excess fluid supplied to the tank 40 together with air entrapped within the tank but will not be so large that they will require a materially enlarged amount of the liquid to be admitted.

What I claim is:

1. A liquid supplying means for aircraft engines comprising in combination, a main tank, a secondary tank, means to force liquid from said main tank to said secondary tank, means to supply liquid from said secondary tank to an engine, and pressure releasing means for said secondary tank adapted to permit the escape of entrapped air from said secondary tank in any position of said secondary tank.

2. A liquid supplying means for aircraft engines comprising in combination, a main tank, a secondary tank, means to supply liquid from said main tank to said secondary tank, means extending to a central portion of said secondary tank for supplying liquid from said secondary tank to an engine, and means to return excess liquid and air from said secondary tank to said main tank in any position of said secondary tank.

3. A liquid supplying means for aircraft engines comprising in combination, a main tank, a secondary tank, means to continuously force liquid from said main tank to said secondary tank, means extending from a submerged portion within said secondary tank with the tank in any position for supplying the liquid from said secondary tank to an engine, and means to release entrapped air from said secondary tank with said secondary tank in any position.

4. A liquid supplying means for aircraft engines comprising in combination, a main tank, a secondary tank, means to force liquid from said main tank to said secondary tank, means extending from a central portion of said secondary tank for supplying liquid from said secondary tank to an engine, and a return conduit terminating at an upper portion of said secondary tank and having a check valve therein for returning excess fluid from said secondary tank to said main tank and permitting the release of air entrapped within said secondary tank.

5. A liquid supplying means for aircraft engines comprising in combination, a main tank, a secondary tank, means to force liquid from said main tank to said secondary tank, a conduit for supplying liquid from said secondary tank to an engine, said conduit having a flexible tubing thereon extending within said secondary tank and weighted upon its free end whereby said free end will be maintained within the lowermost portion of said tank in any position of said tank, and a return from said secondary tank to said main tank.

6. A liquid supplying means for aircraft engines comprising in combination, a main tank, a secondary tank, means to force liquid from said main tank to said secondary tank, a conduit for supplying liquid from the lowermost portion of said secondary tank to an engine with the tank in any position, and means to release entrapped air and any excess liquid from the uppermost portion of said tank with the tank in any position.

In testimony whereof, I hereto affix my signature.

STEPHEN A. HASBROUCK.